S. C. SHAFFNER.
DEVICE FOR TESTING PRESSURE, SPECIFIC GRAVITY, AND VOLUME OF GASES.
APPLICATION FILED NOV. 7, 1911.
1,065,974.     Patented July 1, 1913.
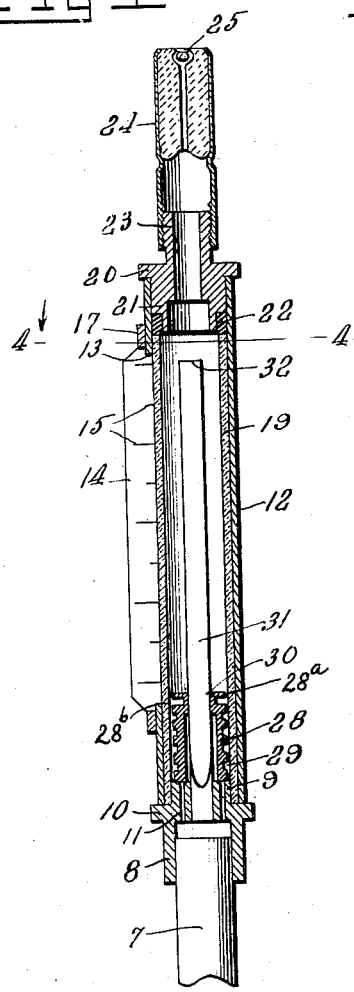
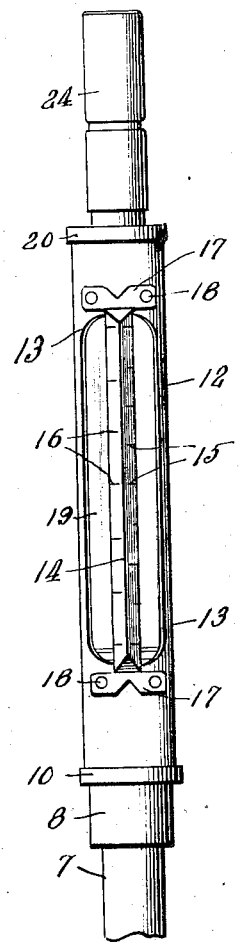
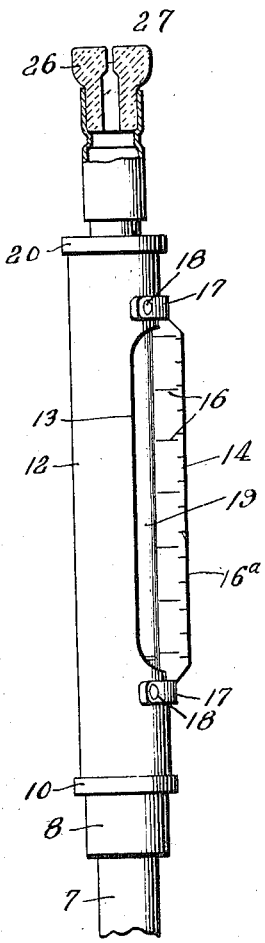
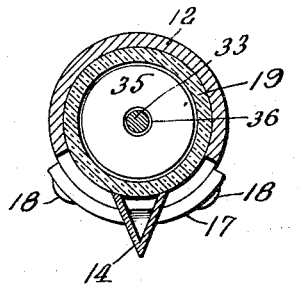
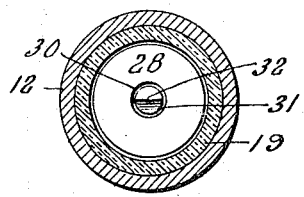
Inventor
Samuel C. Shaffner
Witnesses
By
Attorney

UNITED STATES PATENT OFFICE.

SAMUEL C. SHAFFNER, OF EAST ORANGE, NEW JERSEY.

DEVICE FOR TESTING PRESSURE, SPECIFIC GRAVITY, AND VOLUME OF GASES.

1,065,974.   Specification of Letters Patent.   Patented July 1, 1913.

Application filed November 7, 1911. Serial No. 659,064.

*To all whom it may concern:*

Be it known that I, SAMUEL C. SHAFFNER, a citizen of the United States, residing at East Orange, in the county of Essex and State of New Jersey, have invented new and useful Improvements in Devices for Testing Pressure, Specific Gravity, and Volume of Gases, of which the following is a specification.

My invention relates to measuring devices used in connection with gases of various kinds including acetylene and ordinary illuminating gas, my purpose being to enable the operator to quickly and easily make a number of readings of different character by aid of a very simple, cheap and accurate instrument for the purpose.

More particularly stated, I provide a measuring device of improved construction and adapted for determining certain data relative to gases to be tested as follows: 1. To test the pressure of a gas, its usual or normal pressure being known. 2. To determine the volume of a gas passing per unit of time, the specific gravity of the gas being normal according to a standard. 3. To determine the specific gravity of a gas, a known volume of which is passing per unit of time through a meter.

For the purpose of making these determinations or readings I employ a receptacle in which is mounted a gas control float or indicating member and a scale provided with a plurality of separate sets or groups of graduations adjacent to the position or path of travel of this float, for the purpose of enabling the operator to make the readings direct.

For determining the volume of gas flowing per unit of time I use any sort of burner, for instance a stove burner or a so-called "mantle" burner. In the particular instance illustrated I employ an acetylene cross-jet burner. For measuring pressure and specific gravity, however, I employ a standardized cap having a discharge aperture, the area of which is carefully calibrated, and is always the same—or at least is always known. For the various measurements I employ different groups or sets of graduations all carried, however, by the same scale, and for convenience I designate this scale as a plural scale.

Reference is made to the accompanying drawing forming a part of this specification, and in which like letters indicate like parts.

Figure 1 is a substantially central vertical section through one form of my improved testing device, this view showing the use of an ordinary acetylene burner, and the portion of the scale I employ in connection with such a burner when the device is used for indicating the volume of the gas flowing per unit of time. Fig. 2 is a front elevation of the structure shown in Fig. 1. Fig. 3 is a side elevation showing the side of the device opposite to that appearing in Fig. 1, the portion of the scale visible in this instance being associated with the use of the standardized cap, for measuring the gas pressure actually developed, as compared with, or relatively to, a certain normal or standard pressure desired or expected; or for measuring the specific gravity of a gas as the case may be. Fig. 4 is a section on the line 4—4 of Fig. 1 looking in the direction of the arrow. Fig. 5 is a horizontal section showing the use of a calibrating member having a slightly different form from that appearing in Figs. 1 and 4 inclusive. Fig. 6 is a detail view showing in elevation the calibrating member appearing in Fig. 5.

The supply pipe, popularly called a gas pipe, is shown at 7. Connected with it is a cap 8 provided with a massive portion 9, a flange 10, and holes 11 through said massive portion in a direction parallel with the axis of the cap. A tube 12 made of metal is fitted gas tight upon the cap 8 and is provided with a large opening 13 extending for some distance in the general direction of the length of the tube. A scale 14 is provided with two separate and distinct sets of graduations 15, 16, and 16ª, disposed upon its opposite faces, as will be understood more particularly from Fig. 2. The ends of the scale are provided with ears 17, and extending through the latter are fastenings 18 for holding the scale securely upon the tube 12. The scale extends the full length of the opening 13 and is disposed in such a position as to practically bisect this opening. The glass tube 19 is disposed within the metallic tube 12, and is concentric to the same. The inner surface of the glass tube is rendered strictly cylindrical, by grinding or otherwise, and the ends of the tube are ground in order to secure accuracy in fitting. A metallic cap 20 is fitted into the upper end of the glass tube 19, and is provided with an annular shoulder 21 which engages a packing 22 of annular form, this packing fitting gas-tight upon the upper end of the glass tube. The cap 20 is provided with a neck 23 extending upwardly from it. A burner 24—in this instance an acetylene burner—is provided with a tip or opening 25 through which the gas issues as it is burned.

In some instances, as elsewhere described, I substitute a standardized cap 26 (see Fig. 3) which is provided with an orifice 27 of area in cross section which is always the same, or at least is always known. The standardized cap 26 is always used in connection with the graduations 16, 16ª, or in other words, with the parts of the scale shown in Fig. 3, whereas ordinary burners, such as the acetylene burner 24, are always employed in connection with the graduations 15—that is to say with another portion of the scale, as indicated in Fig. 1.

A float valve 28 is loosely, but neatly, fitted into the glass tube 19, and has generally a cup like form. The float valve is provided externally with a number of annular grooves 29 spaced equidistant and adapted to receive and hold small quantities of gas in order to make the same serve the purpose of packings. It is a fact that a surface, and particularly a metallic surface, if suitably provided with grooves, has a tendency to hold a gas and to increase the density thereof within the grooves. This is probably due, in a measure at least, to the phenomenon known as occlusion. The gas, being held thus within the grooves 19, and its density being in consequence somewhat greater than that of the other portions of the gas from the same source of supply, serves to impede the flow of free gas along the surface in question. The valve thus formed therefore has a surface upon which the free gas acts in order that the valve may operate as if provided with a packing. Nevertheless the float valve does not bind against the inner surface of the glass tube, and is entirely free to assume any position consistent with the forces playing upon it. It is practically frictionless for the reason that the small annular volumes of gas condensed within the grooves serve a purpose analogous to lubrication. Moreover, the pressure of these small volumes of gas being always directed radially inward is equal in all directions, and consequently the float valve is perfectly balanced within the glass tube. The float valve 29 is provided at its top with a circular hole 30. Extending through this hole and supported by the cap 10 is a vertical rod 31, the same having generally the form of an elongated wedge which terminates in a sharp edge 32. This rod, because of the office it performs, I designate as a calibrating member.

The float, owing to its cup-like form, is so supported by the gas that most of the gas pressure is applied to the upper end of the float in much the same manner as if the float was suspended from this upper end, so that the center of gravity of the float, as a whole, is below the point of suspension. This feature lends stability to the position of the float, and tends to maintain the float plumb at all times and under practically all conditions. The float is thus prevented from tilting and tipping, and as a consequence has no tendency to rub or bind unduly upon the inside of the tube. The upper end of the float valve is provided with an annular portion 28ª integral with the body portion of the float and set off slightly therefrom by virtue of a comparatively deep groove 28ᵇ. The annular portion 28ª, thus arranged, serves practically the purpose of a pointer, and as the operator can to some extent see under it by looking through the groove 28ᵇ, he can determine with greater accuracy the position of the float relatively to the graduations.

In some instances I give the calibrating member the form of a cone, as indicated at 33 in Figs. 5 and 6. The cone tapers off to a sharp point at 34. Where the calibrating member has the form shown in Figs. 5 and 6 I employ, in connection with it, a float valve 35 provided with a substantially circular opening 36 of such proportions as to fit neatly but loosely around the bottom of the calibrating member whenever the float valve is in its lowermost position. The float valve 35 is otherwise of the same construction as the float valve 28, and is governed by the same principles.

As above indicated my device is used in three different ways, as follows:

1. *To test the gas pressure actually developed—as compared with a standard normal or usual pressure.*—For this purpose I use the standardized cap 26 and the scale 16, the device being employed as indicated in Fig. 3, and connect the gas pipe 7 with the source of supply of the gas which, as above indicated, is supposed or intended to have a certain standard normal or usual pressure. If the actual pressure developed coincides with the standard pressure the float valve will take up a predetermined position, which is indicated by noting the position of the valve relatively to the scale 16, and the reading is thus determined. If the gas pressure actually developed is greater than normal—that is, if it is too high, the float reaches a higher level, and if the pressure is too low the float drops down, so that in any event, any increase or decrease of the gas pressure actually developed as compared with what it should be, is easily determined. For this purpose, the specific gravity of the gas is known, or at least is assumed to be normal according to a standard.

2. *To test the specific gravity of a gas.*— For this purpose I employ the standardized cap 26 and the graduations 16ª, as shown in Fig. 3. The gas pipe 7 is now connected with a meter, which is known to pass a given volume of gas per unit of time. As the standardized cap 26 is carefully calibrated as to the area of the discharge passage as above explained, and as the meter connected with the pipe 7 is known to pass a given volume of gas per unit of time, it follows that the position assumed by the float must be related to the specific gravity, or what is the same thing, to the density of the gas. That is to say, under the conditions stated, a thick or heavy gas will elevate the float to a higher level than would be the case with a thin and light gas. Such being the case, and the graduations 16ª being suitable for the purpose, the operator can readily determine, by the position of the float relatively to these graduations, the specific gravity of the gas under test.

3. *To test the volume of gas flowing per unit of time, the specific gravity being assumed to be normal.*—For this purpose I employ the ordinary burner 24 together with the graduations 15 of the scale as indicated in Fig. 1. The gas in passing upwardly causes the float valve to rise at a level which is commensurate with the volume flowing per unit of time.

As will be understood from the foregoing description my device is used for more than one purpose, yet all the purposes for which it is employed are more or less related. The device is in effect a combinational instrument which, in one relation, is employed essentially for measuring pressure, in another for determining specific gravity, and in a third for ascertaining the volume of gas flowing per unit of time. In using the device for either of these three separate purposes various parts are always employed and other parts are only brought into service in connection with the particular use to which the device is applied. That is to say, the float and calibrated member are always used, no matter whether the purpose be to ascertain pressure, volume or specific gravity, and consequently whether the burner 24 or standardized cap 26 be employed.

I do not limit myself to the use of any particular material to be employed in the construction of my device, or of any part thereof. In many instances, however, I prefer to make the float valve of aluminum, the tube of glass, and various other parts of metal, though this is merely a matter of individual judgment or convenience. Neither do I limit myself to the use of the device upon any particular kind of gas for one employed for measuring volume for use with any specific type of burner—the scope of my invention being commensurate with my claims.

What I claim as new is:—

1. The combination of a metallic tube provided with an opening extending in the general direction of the length of said tube, a tube of transparent material located within said first mentioned tube, a calibrating member having a cross-section which decreases uniformly from end to end of said calibrating member, and a float valve having the form of a cup and encircling said calibrating member, said float valve being provided externally with a plurality of annular grooves for corralling small quantities of gas and causing the same to serve as a packing.

2. The combination of the tube, a calibrating member extending thereinto and having a cross-section which decreases uniformly from end to end of said calibrating member, a float valve located within said tube and movable by gas pressure relatively to said calibrating member, said float valve being provided with a plurality of annular grooves of a size to corral a minute quantity of gas and cause the same to serve practically as a packing, and a scale coacting with said float valve for indicating the position of the latter.

3. A pressure and volume testing device comprising a tubular member, a calibrating member mounted therein and having a cross-section which decreases uniformly from end to end of said calibrating member, a float valve located within said tubular member and movable by gas pressure relatively to said calibrating member for the purpose of controlling the flow of gas between said float valve and said calibrating member, a plural scale disposed adjacent to the path of travel of said float valve and provided with graduations for indicating pressure, and also with graduations for indicating volume, a burner to be connected with said tubular member when said last mentioned graduations are to be used, and a standardized cap to be connected with said tubular member when said first mentioned graduations are to be employed.

4. A device of the character described comprising a receptacle, a calibrating member mounted therein, a float valve loosely mounted within said receptacle and adapted to be raised therein by the flow of a gas passing therethrough, said valve and said calibrating member having such form that different quantities of gas passing between said calibrating member and said valve raise said valve into different positions, a burner to be detachably connected with said receptacle, a standardized cap to be substituted for said burner, said standardized cap being provided with a discharge orifice of known cross section, and a plural scale on the receptacle for indicating the positions of said valve when said burner is used and when said standardized cap is used.

5. As an article of manufacture, the combination of a tube, a float valve mounted therein and loose relatively thereto, the position of said float valve relatively to said tube being controllable by the flow of gas through said tube, and a double scale disposed adjacent to said tube and provided with different sets of graduations, one set relating to gas pressure and the other set relating to gas volume, and means for connecting said tube with a standardized cap having a discharge orifice of known capacity, or with a burner having a discharge orifice, the area of which is immaterial.

6. As an article of manufacture, the combination of a tube, a scale disposed adjacent thereto, a gas-floated valve having an opening entirely through it, a calibrating member extending into said tube and through said valve, said calibrating member being substantially cylindrical at one of its ends and provided with facets which converge so as to give said calibrating member substantially the general form of an elongated wedge, and a scale for indicating the position of said valve.

7. A gage comprising a transparent tube of uniform diameter throughout, a cap on each end of said tube adapted to connect the opposite ends of the tube respectively with a fluid inlet and a fluid outlet, a metal tube mounted upon said cap about said transparent tube and having a longitudinal opening in one side through which may be observed the interior of said first tube, an upwardly tapering calibrating member carried in said first tube, a float valve surrounding said member, and a two sided scale secured edgewise against the outer tube and bisecting the opening therein longitudinally, said scale having distinct sets of graduations on the opposite sides thereof.

8. In a device of the character described, the combination of a transparent tube, a scale disposed adjacent to the tube and a float valve movably mounted within said tube, said valve comprising an inverted cup-shaped member open at its lower end and provided in its outer surface with a plurality of spaced circumferential grooves, said valve being movable within said tube longitudinally of said scale.

9. In a device of the character described, the combination of a transparent tube, a scale arranged adjacent to the tube and longitudinally thereof, and a float valve mounted to move in said tube and comprising an inverted cup shape member open at its lower end and provided with an annular portion spaced from the body of the valve by a relatively deep circumferential groove, said annular portion serving as a pointer to coöperate with said scale whereby to determine the position of said float valve.

In testimony whereof I have hereunto set my hand in presence of two subscribing witnesses.

SAMUEL C. SHAFFNER.

Witnesses:
EDW. O. HOOD,
E. STEIN.